3,076,409
SPIRAL WOUND SHOTSHELL

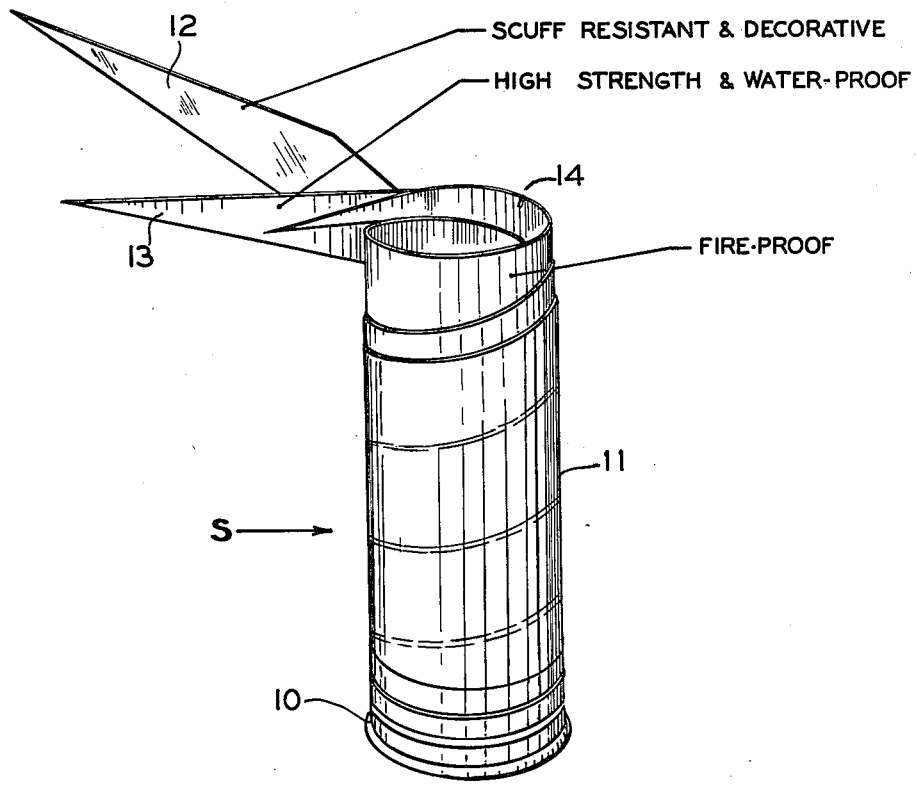

Charles O. Williams and Charles E. Miller, Hamden, Conn., assignors to Olin Mathieson Chemical Corporation, a corporation of Virginia
Filed Sept. 12, 1960, Ser. No. 55,221
1 Claim. (Cl. 102—43)

The present invention relates to shotshells and relates in particular to a shotshell having a metal head and a tubular body formed compositely of a plurality of different materials.

A particular feature of the present invention is the provision of a shotshell formed in part of a multi-layered laminated tube such that the individual layers are selected in accordance with the particular attribute inherent in the material from which the layer is formed.

A further feature of the invention is the provision of a shotshell which lends itself to mass production methods.

A further feature of the invention is the provision of a shotshell tube having high strength longitudinally and circumferentially.

A further feature of the invention is the provision of a shotshell having a laminated tubular wall structure where the wall structure is formed by spirally winding a plurality of ribbons or bands of sheet or film material. By the terms "spiral" and "spirally" is meant a structure wherein the tapes, ribbons, bands, or strips employed extend helically forming helical joints down the length of the wall structure.

A particular advantage afforded by fabricating a tube by spirally winding a plurality of different elements compositely is that one can readily design into the tube special characteristics such as high strength, dimensional stability, inflammability, resistance to moisture, scuff resistance and ability to receive decorative indicia.

Furthermore, the utilization of a spirally wound tube in the manufacture of a shotshell lends itself to continuous manufacture.

A further feature of a shotshell fabricated from a spiral tube resides in the flexibility in choice of manufacturing process steps. For example, selective layers may be wound with a given lead or a given hand while others may be wound in the opposite hand and with a different lead.

The term "hand" is intended to denote the right hand or left hand direction of the spiral in the same fashion that a machine screw is characterized as having a right hand or left hand thread.

The term "lead" is intended to refer to the angle which an edge of the ribbon or tape (being wound in a given layer) subtends with respect to the longitudinal axis of the tube fabricated.

A shotshell embracing certain features of the present invention may comprise a generally tubular body portion connected to a metallic head as by crimping, said body portion having a laminated or composite structure characterizing a plurality of individual spirally wound layers of strip or ribbon material, one layer disposed in the interior of the tube defining a spiral winding of fireproof material, an outer layer of the tube being spirally wound and being fabricated of a scuff resistant material and an intermediate layer comprising a spiral winding of high strength waterproof material.

Other features and advantages of the present invention will become more apparent from an examination of the subsequent specification when read in conjunction with the appended drawings in which:

The single FIGURE shows a shotshell having a tubular multilayered body secured to a metallic head where several of the laminated layers are partially unwound to reveal the individual character of each layer.

The shotshell disclosed in the single figure, referenced generally by the letter S, comprises a metallic head 10 and a tubular body 11 crimped to the head in well known fashion.

The tubular body 11 is fabricated of three layers of distinct materials where all layers are laminated together to produce a composite or laminated tube.

The layers are formed by spirally winding band or ribbon-like material where each layer is wound with a given lead and with a given hand; the lead in a given layer being selected so that the adjacent edges of the wound ribbon abut or overlap as desired.

The outer layer, referenced 12, is formed of material having good resistance to scuff while having a surface suitable for the reception of printing or other decorative indicia.

Preferred examples of material from which the outer layer may be fabricated are polyolefin films, cellophane, polyester films, and metallized films.

An intermediate layer, referenced 13, is fabricated from a class of materials which, in ribbon or bank like form, has high tensile strength and is impervious to water.

Examples of preferred material for use in an intermediate layer are metal foils, paper reinforced with fiberglass, paper and polyolefin laminate.

The inner layer, referenced 14, denotes a tube wound spirally from a band or ribbon of material having flame or fireproof qualities.

Preferred materials from which this layer may be fabricated are waxed paper, film laminates, paper, and foil laminates.

It is to be understood that the structure of the tubular portion of the shotshell of the present invention need not be limited to three layers; as many layers may be used as are deemed desirable depending upon the particular attributes that one intends to design into the tube.

Correspondingly, it is to be understood that the various layers need not be of the same hand nor is it intended that the leads of the various layers be identical.

Depending upon the type of materials used in the various layers, it is frequently desirable to introduce appropriate binders or adhesive materials within a given layer or between layers to effect adhesion and to form the laminated tube into a unitary structure.

For example, a tubular shell body may be integrated of an inner helically wound layer of impregnated paper tape, an outer helically wound layer of a plastic tape formed of plastic sheet material such as a polyolefin film, and an intermediate helically wound layer of a tape of metal foil; furthermore, each tape may be wound in a given lead and with a given hand such that the hand of one layer is opposite the hand of an adjacent layer, which places the joints of successive layers uniformly around the circumference and in intersecting relationship rather than in merely co-linear or staggered relationship, or in one longitudinally extending circumferentially bunched joint.

We claim:

A shot shell comprising a metallic head and a composite tubular body of laminated construction secured to said head, said body having in combination at least three distinct wound layers including a fire-resistant inner layer consisting essentially of impregnated paper, a scuff-resistant outer layer of non-metallic plastic film susceptible of a decorative finish, and a high strength waterproof intermediate layer of metal foil, each layer comprising a tape helically wound with a given lead and hand to form said layer, one of said layers being wound with a hand opposite the hand of an adjacent layer and forming helical joints substantially uniformly and continuously distributed around said body and in intersecting relation with the joints of said adjacent layer.

References Cited in the file of this patent

UNITED STATES PATENTS

| | | |
|---|---|---|
| 2,461,539 | Fletcher | Feb. 15, 1949 |
| 2,984,182 | Fienup et al. | May 16, 1961 |